US011624018B2

(12) United States Patent
Vickers et al.

(10) Patent No.: US 11,624,018 B2
(45) Date of Patent: Apr. 11, 2023

(54) FLAT RHEOLOGY WELLBORE FLUIDS FOR GENERATING CLEAN WELLBORES

(71) Applicant: Schlumberger Technology Corporation, Sugar Land, TX (US)

(72) Inventors: Damian R. Vickers, Houston, TX (US); Chemsseddine Bouguetta, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/291,627

(22) PCT Filed: Nov. 8, 2019

(86) PCT No.: PCT/US2019/060513
§ 371 (c)(1),
(2) Date: May 6, 2021

(87) PCT Pub. No.: WO2020/097489
PCT Pub. Date: May 14, 2020

(65) Prior Publication Data
US 2021/0403789 A1   Dec. 30, 2021

Related U.S. Application Data

(60) Provisional application No. 62/758,224, filed on Nov. 9, 2018.

(51) Int. Cl.
*E21B 33/14* (2006.01)
*C09K 8/36* (2006.01)
*E21B 21/00* (2006.01)

(52) U.S. Cl.
CPC ............... *C09K 8/36* (2013.01); *E21B 21/00* (2013.01); *E21B 33/14* (2013.01)

(58) Field of Classification Search
CPC ............ C09K 8/36; E21B 21/00; E21B 33/14
USPC ....................................................... 166/285
See application file for complete search history.

(56) References Cited

U.S. PATENT DOCUMENTS

| | | | |
|---|---|---|---|
| 4,381,241 A | 4/1983 | Romenesko et al. | |
| 4,508,628 A | 4/1985 | Walker et al. | |
| 5,007,489 A | 4/1991 | Enright et al. | |
| 5,057,234 A | 10/1991 | Bland et al. | |
| 6,147,047 A | 11/2000 | Robbins et al. | |
| 6,387,874 B1 | 5/2002 | Schalitz et al. | |
| 7,534,743 B2* | 5/2009 | Kirsner .................... | C09K 8/34 507/140 |
| 8,476,201 B2 | 7/2013 | Miller et al. | |
| 8,476,206 B1 | 7/2013 | Malshe | |
| 8,569,213 B2 | 10/2013 | Miller et al. | |
| 9,518,206 B2* | 12/2016 | Maghrabi ................ | C09K 8/36 |
| 2004/0110642 A1 | 6/2004 | Thompson et al. | |
| 2005/0049147 A1* | 3/2005 | Patel ........................ | C09K 8/36 507/137 |
| 2009/0107681 A1 | 4/2009 | Hough et al. | |
| 2009/0192052 A1 | 7/2009 | Zhang | |
| 2010/0258313 A1* | 10/2010 | Ballard .................... | C09K 8/64 507/135 |
| 2011/0160099 A1 | 6/2011 | Patel et al. | |
| 2011/0166047 A1 | 7/2011 | Patel et al. | |
| 2011/0180256 A1 | 7/2011 | Tehrani et al. | |
| 2011/0284228 A1* | 11/2011 | Huang ..................... | C09K 8/40 507/248 |
| 2012/0067575 A1 | 3/2012 | Luyster et al. | |
| 2012/0080232 A1 | 4/2012 | Muller et al. | |
| 2013/0048281 A1 | 2/2013 | Van Zanten et al. | |
| 2013/0085086 A1* | 4/2013 | Harris ..................... | C08G 61/02 507/125 |
| 2013/0137611 A1 | 5/2013 | Pierce et al. | |
| 2013/0331303 A1 | 12/2013 | Rife et al. | |
| 2014/0090897 A1* | 4/2014 | Lee .......................... | C09K 8/28 507/118 |
| 2014/0349908 A1 | 11/2014 | Delaney et al. | |
| 2014/0357533 A1 | 12/2014 | Wells et al. | |
| 2018/0155610 A1 | 6/2018 | Goual et al. | |
| 2018/0244975 A1 | 8/2018 | Khramov et al. | |

(Continued)

FOREIGN PATENT DOCUMENTS

| | | |
|---|---|---|
| CN | 103555304 A | 2/2014 |
| EP | 2258803 A2 | 12/2010 |

(Continued)

OTHER PUBLICATIONS

Technical Data Sheet of Tergitol 15-S-3 of The Dow Chemical Company (Year: 2021).
Office Action issued in U.S. Appl. No. 15/904,897 dated Mar. 24, 2021, 9 pages.
International Search Report and Written Opinion issued in International Patent application PCTUS2018/019758, dated Jun. 21, 2018, 12 pages.
International Preliminary Report on Patentability issued in International Patent application PCTUS2018/019758, dated Aug. 27, 2019.
Office Action issued in U.S. Appl. No. 15/905,053, dated Aug. 24, 2020, 37 pages.
Office Action issued in U.S. Appl. No. 15/905,053; dated May 1, 2020 (29 pages).

(Continued)

*Primary Examiner* — William D Hutton, Jr.
*Assistant Examiner* — Ashish K Varma

(57) ABSTRACT

A method of drilling a wellbore may include drilling the wellbore using a wellbore fluid that has rheological property values for 6 rpm, 10 minute gel, Yield Point, and/or 10 minute-to-10 second gel ratio that are +/20% of the mean values across a temperature range from 40° F. to 300° F.; and conditioning the wellbore with less than 2 hole volumes. The wellbore fluid may include an oleaginous external phase; a non-oleaginous internal phase; an amidoamine emulsifier stabilizing the non-oleaginous internal phase within the oleaginous external phase; at least two oil wetting agents; a rheology modifier; and a weighting agent having a d50 ranging from 5 to 10 μm.

9 Claims, No Drawings

(56) References Cited

U.S. PATENT DOCUMENTS

| | | | |
|---|---|---|---|
| 2018/0244976 A1 | 8/2018 | Cliffe et al. | |
| 2018/0362833 A1 | 12/2018 | Jackson et al. | |
| 2019/0382641 A1 | 12/2019 | Cliffe et al. | |
| 2020/0231860 A1 | 7/2020 | Khramov et al. | |

FOREIGN PATENT DOCUMENTS

| | | | |
|---|---|---|---|
| GB | 2309240 | A | 7/1997 |
| RU | 2458958 | C1 | 8/2012 |
| RU | 2492207 | C1 | 9/2013 |
| WO | 0041480 | A2 | 7/2000 |
| WO | 02053676 | A1 | 7/2002 |
| WO | 2012003325 | A1 | 1/2012 |
| WO | 2013095934 | A2 | 6/2013 |
| WO | 2016010518 | A1 | 1/2016 |
| WO | 2016137922 | A1 | 9/2016 |
| WO | 2019028198 | A1 | 2/2019 |

OTHER PUBLICATIONS

Office Action issued in U.S. Appl. No. 15/905,053; dated Nov. 13, 2019, (21 pages).

Office Action issued in U.S. Appl. No. 15/905,053, dated Aug. 9, 2019, 9 pages.

Office Action issued in U.S. Appl. No. 15/905,053, dated May 28, 2021, 16 pages.

International Search Report and Written Opinion issued in International Patent application PCTUS2018/019759, dated Jun. 21, 2018, 12 pages.

International Preliminary Report on Patentability issued in International Patent application PCT/US2018/019759, dated Aug. 27, 2019.

Office Action received in U.S. Appl. No. 16/487,830 dated Oct. 9, 2020, 8 pages.

Extended European Search Report and Opinion issued in EP Patent Application No. 18758013.9 dated Dec. 7, 2020, 6 pages.

Office Action issued in U.S. Appl. No. 16/487,830, dated Mar. 23, 2021, 8 pages.

International Search Report and Written Opinion issued in International Patent application PCT/US2019/060513 dated Apr. 9, 2020, 13 pages.

International Preliminary Report on Patentability issued in International Patent application PCT/US2019/060513 dated May 20, 2021, 10 pages.

Spectrum Chemical MFG Corp, Tergitol(R) TMN-g, Surfactant, Product Details, retrieved May 25, 2021 from https://www.spectrumchemical.com/OA HTML/chemical-products Tergitol R-TM N-6-Surfactant T1303.jsp (Year: 2021).

Search Report and Office Action issued in Russian Patent Application No. 2019130054 dated Jul. 5, 2021, 10 pages with English translation.

Office Action issued in U.S. Appl. No. 15/904,897 dated Jul. 26, 2021, 12 pages.

Office Action issued in U.S. Appl. No. 15/605,053 dated Jan. 6, 2022, 15 pages.

Decision on Grant issued in Russian Patent Application dated Dec. 8, 2021, 16 pages.

Office Action issued in U.S. Appl. No. 15/605,053 dated Oct. 13, 2021, 7 pages.

Exam Report issued in United Kingdom Patent Application No. GB1912094.8 dated Sep. 1, 2021, 4 pages.

Neodol 25-3, Technical Data Sheet, retrieved Sep. 21, 21 from file:///C:/Users/aditrani/Documents/e-Red%20Folder/15905053/neodol-25-3-tds-nov-2020.pdf.

Spectra Base, Silwet L-77, retrieved Sep. 21, 2021 from https://spectrabase.com/spectrum/7Wh07HcgEuf.

Exam Report issued in United Kingdom Patent Application No. GB1912094.8 dated Feb. 18, 2022, 4 pages.

Search Report under Section 17(8) issued in United Kingdom Patent Application No. GB1912094.8 dated May 13, 2022, 2 pages.

Preliminary Office Action issued in Brazil Patent Application No. BR112019017731-0 dated Apr. 29, 2022, 6 pages with English translation.

1st Exam Report issued in Saudi Arabian Patent Application No. 519402534 dated Mar. 18, 2022, 9 pages with English translation.

Office Action issued in U.S. Appl. No. 16/556,798 dated Apr. 11, 2022, 9 pages.

\* cited by examiner

FLAT RHEOLOGY WELLBORE FLUIDS FOR GENERATING CLEAN WELLBORES

CROSS-REFERENCE TO RELATED APPLICATIONS

This application claims priority to U.S. Patent Application No. 62/758,224, filed on Nov. 9, 2018, which is herein incorporated by reference in its entirety.

BACKGROUND

During wellbore operations, various fluids may be used in the well for a variety of functions. The fluids may be circulated through a bore hole, which may subsequently flow upward through the wellbore to the surface. During this circulation, the drilling fluid may remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Wellbore fluids may take the form of oil-based fluids such as invert emulsion muds. The components of the invert emulsion fluids include an oleaginous liquid such as hydrocarbon oil which serves as a continuous phase, a non-oleaginous liquid such as water or brine solution which serves as a discontinuous phase, and an emulsifying agent. Emulsifying agents may be used to lower the interfacial tension of the liquids so that the non-oleaginous liquid may form a stable dispersion of fine droplets in the oleaginous liquid. Additionally, such invert emulsion fluids may contain one or more weighting agents, surfactants, viscosifiers, fluid loss control agents or bridging agents.

DETAILED DESCRIPTION

In one aspect, embodiments disclosed herein relate to flat rheology fluids that provide optimum properties for use during wellbore construction that produces clean wellbore holes and eliminates or minimizes conditioning needed for prior to cement and liner operations. Wellbore fluids in accordance with the present disclosure include are flat rheology invert emulsion fluids containing an amidoamine emulsifier and a combination of wetting agents and/or rheology modifiers.

Drilling fluids for deepwater applications may be designed to maintain flat rheology for drill cuttings transport and weight material suspension. Flat rheology is a concept centered around uniformity of rheological properties over ranges of temperatures, pressures, or shear rates. Flat rheology fluids provide improved hole cleaning characteristics and minimize frictional pressure losses over conventional non-flat deepwater drilling fluids. Flat rheology systems often combine good cuttings transport, better weight material suspension, and reduced impact on annular pressure losses.

The use of flat rheology fluids has lead to a continuous regression over the years of loss circulation events, as compared to results obtained while drilling large hole sections with costly synthetic fluids. With the reduction of loss circulation events while drilling comes the desire to drill the overburden sections of deepwater wells even faster to minimize rig days to total depth (TD) and consequently total well costs. Flat rheology drilling fluids have met these goals, but a solution has yet to be found for fluids having optimum properties for drilling clean wellbores suitable for continuing on to successful cement and liner jobs without intervention.

A successful cement job is defined as (1) casing or liner run to section TD without obstruction or excessive downhole losses, and (2) a cementation in place that provides full zonal isolation without remedial measures such as top squeezing. Traditional flat rheology systems may be used to drill clean wellbores, but require excessive rig time to be conditioned prior to installation of casing or lining and may compromise the drilling rates to section TD in order to achieve a successful isolation of the overburden formations and provide a strong coal seam gas (CSG)/Liner shoe for the sections to be drilled ahead.

Traditional flat rheology systems may be used to drill wellbores, but require considerable rig time for conditioning processes prior to installation of casing or lining and may compromise the drilling rates attainable during progress to section total depth (TD) in order to achieve a successful isolation of the overburden formations and provide a strong coal seam gas (CSG)/Liner shoe for the sections to be drilled ahead.

Flat rheology wellbore fluids in accordance with the present disclosure may be used as a drilling fluid to generate a wellbore that is cement-job ready with minimum treatment or conditioning times. In one or more embodiments, flat rheology wellbore fluids may be formulated to remove cuttings and residues generated while drilling, producing a clean wellbore that does not alter the chemical nature or modify the performance of treatments injected subsequently. In some embodiments, flat rheology wellbore fluids may be applied to deepwater applications, which include the use of flat rheology fluids in drilling with enhanced penetration rates, and for preparation for cement jobs without excessive and costly dilution or lengthy conditioning times.

In particular, while the fluids of the present disclosure may have a flat rheology across temperature fluctuations, it is believed that in reaching total depth, there is a change in the fluid at higher pressures. Specifically, as pressure increases with a deeper well, the fluid may thicken, thereby improving the carrying capacity of the fluid. Thus, the change in fluid properties at TD may allow for the fluid to better carry the cuttings from the hole bottom to the surface, and therefore reduce the amount of conditioning needed. Such reduction may be a reduction by least 25%, 50%, or 75% of the conventional conditioning time and/or volume. For example, it is envisioned that the well may be circulated for less than two hole volumes, less than 1.5 hole volumes, less than 1 hole volume, or less than 0.5 hole volume.

Flat Rheology Invert Emulsions

Flat rheology wellbore fluids in accordance with the present disclosure may include an invert emulsion having a continuous oleaginous phase and a discontinuous aqueous (or non-oleaginous liquid) phase, among other substances and additives. Wellbore treatment fluids in accordance with the present disclosure may be formulated as a water-in-oil emulsion and, in some cases, a high internal phase ratio (HIPR) emulsion in which the volume fraction of the internal aqueous phase is a high as 90 to 95 percent.

In one or more embodiments, flat rheology wellbore fluids may include an invert emulsion having an oleaginous external phase and a non-oleaginous internal phase. The invert emulsion may also include a blend of emulsifiers, such as an amidoamine primary emulsifier, and a blend of oil wetting agents, rheology modifiers, weighting agents, temperature stabilizing agents, thinners, and other various additives. Each of these components will be discussed in further detail in the following sections.

Prior to describing the specific components in detail, it should be understood that "flat rheology" means that the wellbore fluid maintains consistent rheological properties over temperature ranges from 40° F. to 250° F. or even 300° F. The rheological properties of general focus for a flat rheology profile include 6 rpm, 10 minute gel (10'), Yield Point (YP), and 10 minute-to-10 second gel ratio (10':10" gel ratio). With respect to 6 rpm, 10' gel, and YP, a system is considered to have a flat rheology profile when these values are within +/20% of the mean values across temperature ranges from 40° F. to 300° F. Lower percent variation will yield a more flat rheology profile, so values within +/15% may be present in some embodiments, and +/10% is even more particular embodiments. With respect to 10':10" gel ratio, a system is considered to have a flat rheology profile when the ratio is 1.5:1 or less. Further, as mentioned above, the fluid of the present disclosure may have a flat rheology over the temperature range, but when exposed to elevated pressures at or near total depth, the rheology may deviate from these ranges, increasing by more than 10%, 15% or 20%, or to have a 10':10" gel ratio of greater than 1.5:1. Further, it is also envisioned that the rheological properties at high shear may increase to increase the hole cleaning capacity.

Oleaginous External Phase

Flat rheology wellbore fluids in accordance with the present disclosure include an oleaginous external phase and a non-oleaginous (aqueous) internal phase. Suitable oleaginous fluids that may be used to formulate invert emulsions may include a natural or synthetic oils such as diesel oil, mineral oil, synthetic oils such as such as hydrogenated and unhydrogenated olefins, polyalpha olefins, linear and branch olefins, and the like, polydiorganosiloxanes, siloxanes, or organosiloxanes, esters of fatty acids such as straight chain, branched and cyclical alkyl ethers of fatty acids; and mixtures thereof. In one or more embodiments, wellbore fluids may include an oleaginous continuous phase that includes one or more C16 to C18 olefins. In some embodiments, the oleaginous continuous phase may include one or more internal olefins.

In one or more embodiments, invert emulsions may include an oleaginous external phase a percent by volume (vol %) of the wellbore fluid in a range having a lower limit selected from any one of 30 vol %, 40 vol %, 50 vol %, and 60 vol %, to an upper limit selected from any one of 70 vol %, 80 vol %, 95 vol %, and 99 vol %, where any lower limit may be combined with any upper limit. However, the amount of oleaginous liquid in the invert emulsion fluid may vary depending upon the particular oleaginous fluid used and the particular application in which the invert emulsion fluid is to be employed.

Internal Phase

Invert emulsions in accordance with the present disclosure include a non-oleaginous (aqueous) internal phase. Non-oleaginous liquids may include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water.

In one or more embodiments, non-oleaginous fluids may include brines prepared from organic salts, such as sodium, potassium, or cesium formate, and/or inorganic salts such as halides selected from the group of alkaline earth halides or zinc halides, including calcium chloride or calcium bromide. Sodium bromide, potassium bromide, or cesium bromide or other monovalent halides may also be used. The salt may be chosen for compatibility reasons, such as when where the reservoir drilling fluid used a particular brine phase and the completion/clean up fluid brine phase is chosen to have the same brine phase.

In one or more embodiments, invert emulsions may include a non-oleaginous internal phase a percent by volume (vol %) of the wellbore fluid in a range having a lower limit selected from any one of 1 vol %, 5 vol %, 10 vol %, 25 vol %, 50 vol %, and 60 vol %, to an upper limit selected from any one of 25 vol %, 30 vol %, 50 vol %, 60 vol %, and 70 vol %, where any lower limit may be combined with any upper limit. In some embodiments, the non-oleaginous internal phase may include calcium chloride present at a percent by volume (vol %) of the wellbore fluid in the range of 5 vol % to 30 vol %.

Emulsifier

Flat rheology wellbore fluids in accordance with the present disclosure may include a primary emulsifier based on amidoamine chemistry in some embodiments. Amidoamines that provide fluids with flat rheology profiles may include amidoamines formed from reacting one or more fatty reagents with a polyamine. Polyamines that may be used to prepare amidoamines in accordance with the present disclosure may include linear or branched organophilic C6-C36 fatty polyamines including polyaliphatic polyamines, heterocyclic polyamines, and the like. For example, polyamines may include polyethylene polyamines such as diethylene triamine, triethylene tetramine, and tetraethylene pentamine. Fatty reagents in accordance with the present disclosure may include saturated and unsaturated, branched and linear, fatty acids, including C6-C30 fatty acids such as lauric acid, myristic acid, palmitic acid, stearic acid, oleic acid, linoleic acid, tall oil or fatty acids (TOFA); C6-C30 alkenyl acids, C6-C30 arylalkyl acids, C6-C30 cycloalkyl acid. Exemplary emulsifiers in accordance with the present disclosure may include RheMul™ and SUREMUL™, which are commercially available emulsifiers manufactured and distributed by M-I, L.L.C.

Oil Wetting Agent

Flat rheology wellbore fluids in accordance with the present disclosure may include a combination of oil wetting agents that includes a fatty acid and a fatty alcohol alkoxylate.

Fatty acid oil wetting agents in accordance with the present disclosure may include saturated and unsaturated, branched and linear, fatty acids, including C6-C30 fatty acids such as lauric acid, myristic acid, palmitic acid, stearic acid, oleic acid, linoleic acid, tall oil or fatty acids (TOFA); C6-C30 alkenyl acids, C6-C30 arylalkyl acids, C6-C30 cycloalkyl acid.

Fatty alcohol alkoxylate wetting agents may include branched or linear primary alcohol ethoxylates, secondary alcohol ethoxylates, branched or linear alkylphenol ethoxylates, branched or linear alkyl amine ethoxylates, alkyl ether amine ethoxylates, linear alcohol alkoxylates, and the like. In some embodiments, fatty alcohol alkoxylates may include saturated and unsaturated, linear and branched C8 to C22 fatty alcohols alkoxylated with one to four repeats of a C2 to C4 epoxide such as ethylene oxide, propylene oxide, and the like.

In one or more embodiments, fatty alcohol ethoxylates according to the present disclosure may be generally depicted by Formula I below.

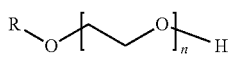

Formula I whereas an alcohol propoxylate would substitute a propylene oxide for the ethylene oxide used in an alcohol ethoxylate. It is also envisioned that a combination of ethoxylation and propoxylation may be used. In Formula I, R may be a C10-28 alkyl group (either linear or branched, saturated or unsaturated) and n may range between 2 and 6 (or 3 and 5 in some embodiments). Further, it is also envisioned that R and n are not limited to such ranges, but may be selected such that the resulting HLB is within the ranges described herein. In particular embodiments, R may be an oleyl group, a stearyl group, a tridecyl group, or a lauryl group. For example, in one or more embodiments, the wetting agent may be at least one alcohol ethoxylate selected from group of oleyl alcohol-2-ethyoxylate, oleyl alcohol-3-ethyoxylate, oleyl alcohol-5-ethyoxylate, stearyl alcohol-2-ethyoxylate, stearyl alcohol-3-ethyoxylate, lauryl alcohol-4-ethyoxylate, and tridecyl alcohol-3-ethyoxylate.

In one or more embodiments, the fatty alcohol ethoxylate of the present disclosure may be depicted by Formula II below. Formula II represents a secondary alcohol ethoxylate.

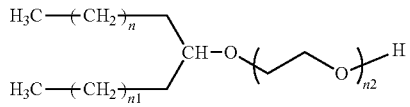

Formula II

In one or more embodiments, $n+n1=12$ and $n2=2-4$. In one or more embodiments, the secondary alcohol ethoxylate of Formula II has an n2 value of 2.

Examples of fatty alcohol alkoxylates also include octyl alcohol ethoxylate, caprylic alcohol ethoxylate, decyl alcohol ethoxylate, lauryl alcohol ethoxylate, oleyl alcohol ethoxylate, oleyl alcohol-3 ethoxylate, palmitoleic alcohol ethoxylate, isostearyl alcohol ethoxylate, octyl dodecanol ethoxylate, octyl decanol ethoxylate, equivalent propylated and iso-propylated derivatives, and the like. FAZEWET™, RHECON™, VERSACOAT™, SUREWET™, VERSAWET™, RHECON™, MEGAMUL™, SUREMUL™, ONEMUL™, ACTIMUL RD™, MUL-XT™, and VERSAWET™ NS are examples of commercially available wetting agents manufactured and distributed by M-I L.L.C. that may be used in the fluids disclosed herein.

Rheology Modifier

Flat rheology wellbore fluids in accordance with the present disclosure may include one or more rheology modifiers that modify low shear rate viscosity (LSRV) for the fluid system. In one or more embodiments, rheology modifiers may reduce the increase in viscosity (flatten the rheological characteristics) of the wellbore fluid over a temperature range from about 40° F. to about 150° F.

Rheology modifiers in accordance with the present disclosure may be one or more poly-carboxylic fatty acids generated from the polymerization/oligomerization of unsaturated fatty acids. Poly-carboxylic fatty acids may include dimer poly-carboxylic C12 to C22 fatty acids, trimer poly-carboxylic C12 to C22 fatty acids, tetramer poly-carboxylic C12 to C22 fatty acid, and mixtures of such acids. For example, rheology modifiers may be prepared by dimerization/trimerization of unsaturated fatty acids containing from 8 to about 18 carbon atoms, including 9-dodecenoic(cis), 9-tetradecenoic(cis), 9-octadecenoic(cis), octadecatetranoic acids, and the like. Rheology modifiers in accordance with the present disclosure may include SUREMOD™ and RHEFLAT™, which are commercially available rheology modifiers manufactured and distributed by M-I L.L.C. that may be used in the fluids disclosed herein.

Additives

Flat rheology wellbore fluids in accordance with the present disclosure may include a number of additives that modify various properties of the fluids such as organophilic clays, viscosifiers, weighting agents, bridging agents, fluid loss control agents, additives to reduce or control low temperature rheology, additives to provide thinning, additives for enhancing viscosity, additives for high temperature high pressure control, emulsion stability, and inhibit corrosion.

Weighting agents or density materials suitable for use in wellbore fluid formulations in accordance with the present disclosure include, but are not limited to, hematite, magnetite, iron oxides, illmenite, barite, siderite, celestite, dolomite, calcite, manganese oxides, halites and the like. In other embodiments, the micronized weighting agents may be coated with a dispersant. MICROBAR™ is an example of commercially available weighting agent manufactured and distributed by M-I L.L.C. that may be used in the fluids disclosed herein.

In one or more embodiments, weighting agents may have a weight average particle diameter (d50) in a range having a lower limit selected from any one of 0.5 μm, 1 μm, 2 μm, and 5 μm, to an upper limit selected from any one of 3 μm, 6 μm, 8 μm, and 10 μm, where any lower limit may be combined with any upper limit. In some embodiments, the weighting agents may have a weight average particle diameter (d50) in a range of 6 μm to 8 μm.

Flat rheology wellbore fluids in accordance with the present disclosure may include one or more thinners to reduce flow resistance and gel development prior to operations downstream of drilling, such as modifying fluid rheology prior to running casing. Examples of wellbore fluid thinners that may be used include lignosulfonates, lignitic materials, modified lignosulfonates, polyphosphates, fatty alcohol sulfates, fatty alcohol ether sulfates, akylbenzenesulfonates, and tannins.

In one or more embodiments, thinners include the product of a reaction between an alkyl cyclic anhydride and a polar reactant such as an alkyl amine, alkanolamine, or polyamine to form a covalent linkage such as an amide or imide. In some embodiments, alkyl cyclic anhydrides in accordance with the present disclosure may be of the general formula:

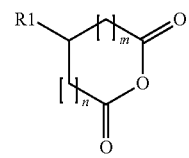

wherein R1 is an alkyl chain having a carbon number of 20 to 300 that is branched or linear; m is an integer selected from 0 to 4; and n is an integer selected from the range of 0 to 4, wherein the sum of m and n is 1 or greater.

In one or more embodiments, polar reactants used to generate thinners in accordance with the present disclosure may include C1 to C10 alkyl amines, such as methyl amine, ethyl amine, and the like. Alkyl amines may be substituted or non-substituted, branched or unbranched, saturated and unsaturated. In some embodiments, alkyl amines may include aryl groups or other aromatic structures such as benzyl, phenyl, phenolic, and the like.

In some embodiments, alkanolamines used to generate thinners in accordance with the present disclosure may include ethanolamine, diethylethanolamine, diethanolamine, triethanolamine, methyl ethanolamine, ethyl ethanolamine, propylethanolamine, methyl diethanolamine, ethyl diethanolamine, dimethylethanolamine, diethyl ethanolamine, and the like. In one or more embodiments, alkanolamines include polyetheramines, amine functionalized oligomers and polymers of ethylene oxide and propylene oxide, polyesteramines, polysilaneamines, polysiloxaneamines, polyalkylamines such as polybutadieneamine, and the like.

Polar reactants used to generate thinners in accordance with the present disclosure may also include polyamines such as ethylene diamine, diethylene triamine, triethylene tetramine, tetraethylene pentamine, 1,4-aminobutane, 1,3-diaminobutane, hexamethylene diamine, 3 (n-isopropylamino)propylamine, N,N-diethyl-1,3-propanediamine, hexapropylene heptamine, penta(1-methyl propylene) hexamine, tetrabutylenepentamine, hexa-(1,1 dimethyl ethylene) heptamine, di(1-methylbutylene)triamine, pentaamylhexamine, and the like. Polyamines may also be cyclic polyamines, including six-member rings such as piperidine, piperizine, or higher order rings such as seven-member, eight-member, and the like. Cyclic polyamines may also incorporate one or more heteroatoms such as oxygen or sulfur, including cyclic polyamines such as morpholine, thiomorpholine, and the like.

In some embodiments, thinners may include polymeric inhibitors such as polyisobutylene succinic anhydride (PIBSA), PIBSA amine adducts such as amino alcohol derivatives PIBSA/monoethanolamine, PIBSA/diethanolamine, PIBSA/N-hydroxyethyl piperazine, PIBSA/3-hydroxybutylamine, PIBSA/N,N,N'-tris-(2-hydroxyethyl)ethylenediamine, and PIBSA/tris-(hydroxymethyl)aminomethane, polyacrylates, polyoxyalkylenes, block copolymers, and the like. RheThin™ is a commercially available thinning agent manufactured and distributed by M-I L.L.C. that may be used in the fluids disclosed herein.

The fluids disclosed herein are useful in the drilling, completion and working over of subterranean oil and gas wells, including deepwater wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations. Conventional methods can be used to prepare the completion fluids disclosed herein in a manner analogous to those normally used, to prepare conventional oil-based fluids. In cases where an invert emulsion is desired, a desired quantity of oleaginous fluid such as a base oil and a suitable amount of a surfactant are mixed together and the remaining components are added sequentially with continuous mixing. An invert emulsion may also be formed by vigorously agitating, mixing or shearing the oleaginous fluid and the non-oleaginous fluid.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of drilling a wellbore, comprising:
    drilling the wellbore using a wellbore fluid that has rheological property values for 6 rpm, 10 minute gel, Yield Point, and/or 10 minute-to-10 second gel ratio that are +/−20% of the mean values across a temperature range from 40° F. to 300° F.; and
    conditioning the wellbore with less than 2 hole volumes;
    wherein the wellbore fluid comprises:
    an oleaginous external phase;
    a non-oleaginous internal phase;
        an amidoamine emulsifier stabilizing the non-oleaginous internal phase within the oleaginous external phase;
    at least two oil wetting agents;
    a rheology modifier, wherein the rheology modifier comprises a dimer or trimer poly-carboxylic C12-C22 fatty acid; and
    a weighting agent having a d50 ranging from 5 to 10 µm.

2. The method of claim 1, wherein the wellbore fluid has rheological property values for 6 rpm, 10 minute gel, Yield Point, and/or 10 minute-to-10 second gel ratio that are +/−10% of the mean values across the temperature range.

3. The method of claim 1, wherein the wellbore fluid has rheological property values for 6 rpm, 10 minute gel, Yield Point, and/or 10 minute-to-10 second gel ratio that increase by more than 10% above 300° F.

4. The method of claim 1, further comprising displacing the wellbore fluid after conditioning with less than 2 hole volumes.

5. The method of claim 4, further comprising: cementing the wellbore.

6. The method of claim 1, wherein the weighting agent has a d50 ranging from 6 to 8 µm.

7. The method of claim 1, wherein the at least two oil wetting agent comprise a fatty acid and a fatty alcohol alkoxylate.

8. The method of claim 1, further comprising: adding a thinner to the wellbore fluid prior to running casing.

9. The method of claim 1, wherein the wellbore is conditioned with less than 1.0 hole volume.

* * * * *